Figure 5:
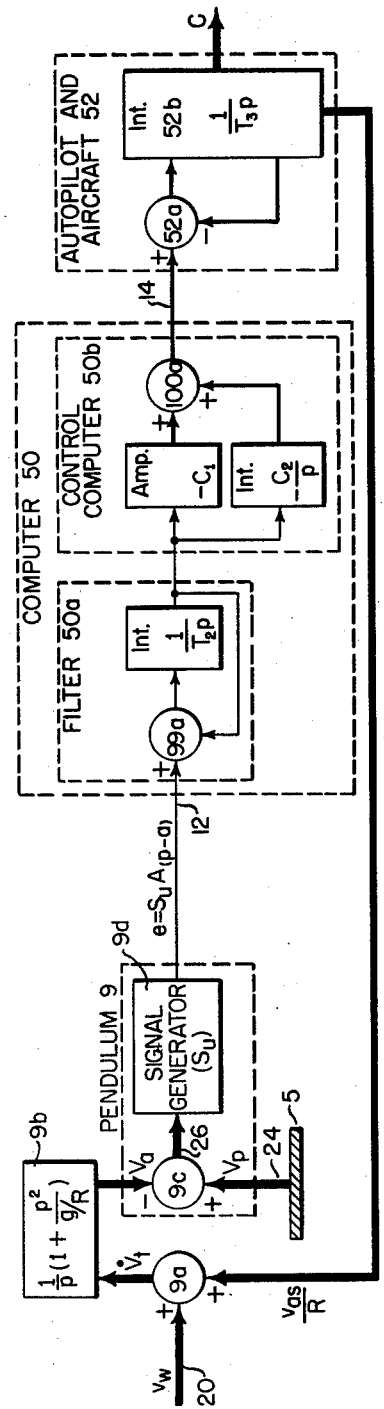

Nov. 24, 1964
R. B. WOODBURY ETAL
3,158,339
GUIDANCE SYSTEM
Filed Aug. 14, 1952
3 Sheets-Sheet 1
Fig. 1
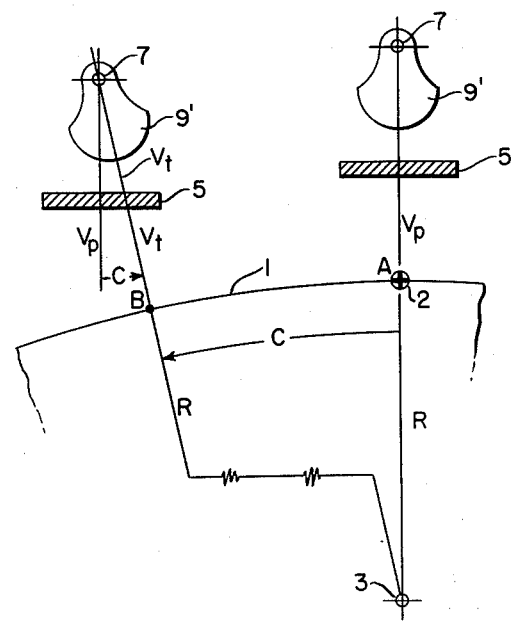
Fig. 2
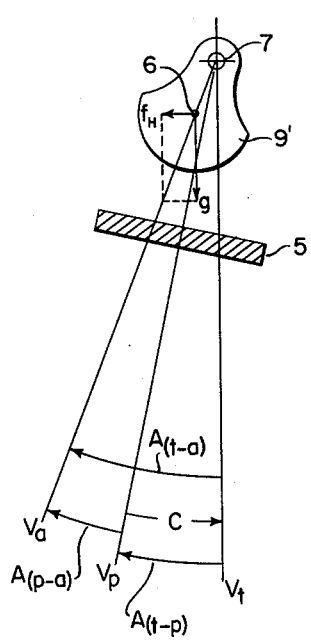
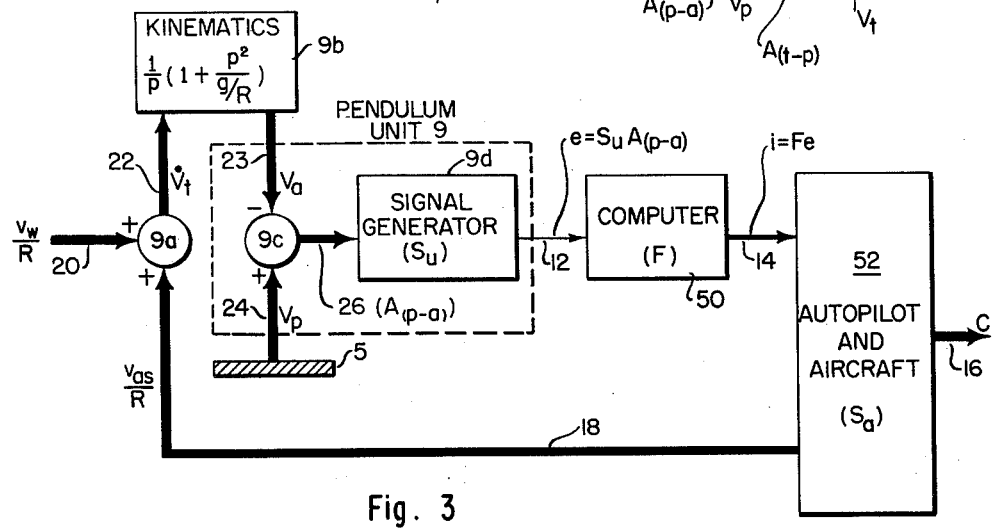
Fig. 3
INVENTORS
ROGER B. WOODBURY
JOHN F. HUTZENLAUB
DONALD J. ATWOOD
BY *Kenway, Jenney, Witter*
*& Hildreth*
ATTORNEYS Nov. 24, 1964                R. B. WOODBURY ETAL                3,158,339
                                GUIDANCE SYSTEM
Filed Aug. 14, 1952                                          3 Sheets-Sheet 2

INVENTORS
ROGER B. WOODBURY
JOHN F. HUTZENLAUB
DONALD J. ATWOOD

BY Kenway, Jenney, Witter
  + Hildreth

ATTORNEYS

INVENTORS
ROGER B. WOODBURY
JOHN F. HUTZENLAUB
DONALD J. ATWOOD

BY Kenway, Jenney, Witter
 & Hildreth

ATTORNEYS

United States Patent Office 3,158,339
Patented Nov. 24, 1964

3,158,339
GUIDANCE SYSTEM
Roger B. Woodbury, Waltham, John F. Hutzenlaub, Winchester, and Donald J. Atwood, Cambridge, Mass., assignors, by mesne assignments, to Massachusetts Institute of Technology, a corporation of Massachusetts
Filed Aug. 14, 1952, Ser. No. 304,386
7 Claims. (Cl. 244—77)

The present invention relates to guidance systems and more particularly to Schuler pendulum apparatus for maintaining a vehicle on a desired course.

Formerly a vehicle was maintained on its course by a pilot or navigator, utilizing either landmarks or celestial navigation or dead reckoning. However, particularly in aircraft, increased speed and altitude combined with the need for arriving at destination with considerable accuracy make it desirable to perform this operation automatically, by means of a guidance system.

Other methods have made use of ground signals to the vehicle as in radar landing systems or loran-type navigation. Such systems are not particularly suitable for long-range navigation, especially for aircraft. Automatic star-tracking has the disadvantage of being subject to weather interference and, over a long trip, of requiring complicated apparatus to shift from one star to another. It would be desirable to be able to navigate automatically using no reference outside the vehicle.

It is therefore one object of the present invention to provide means for maintaining a vehicle on a course independently of any reference except the gravity force within the vehicle.

It is another object of the present invention to provide means for maintaining a vehicle on a course with greater accuracy than hitherto possible.

In furtherance of these and other objects as will hereinafter appear, the principal feature of the present invention is the comparison of the vertical at the vehicle position with what the vertical would be if the vehicle were on course and using the difference to activate an automatic pilot to return the vehicle to its course.

A further feature of the present invention is the use of Schuler tuning conditions to produce an accurate indication of the vertical, free of errors due to horizontal accelerations.

Another feature of the present invention is the inclusion of damping to remove or reduce errors which arise from the fact that error-producing accelerations are generated when the vehicle is returned to its course.

Figure 4:
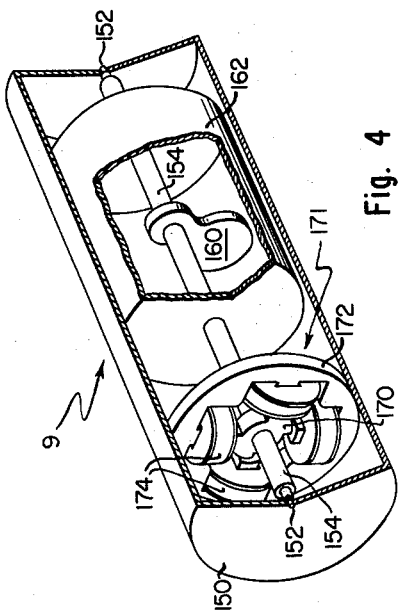
Figure 6:
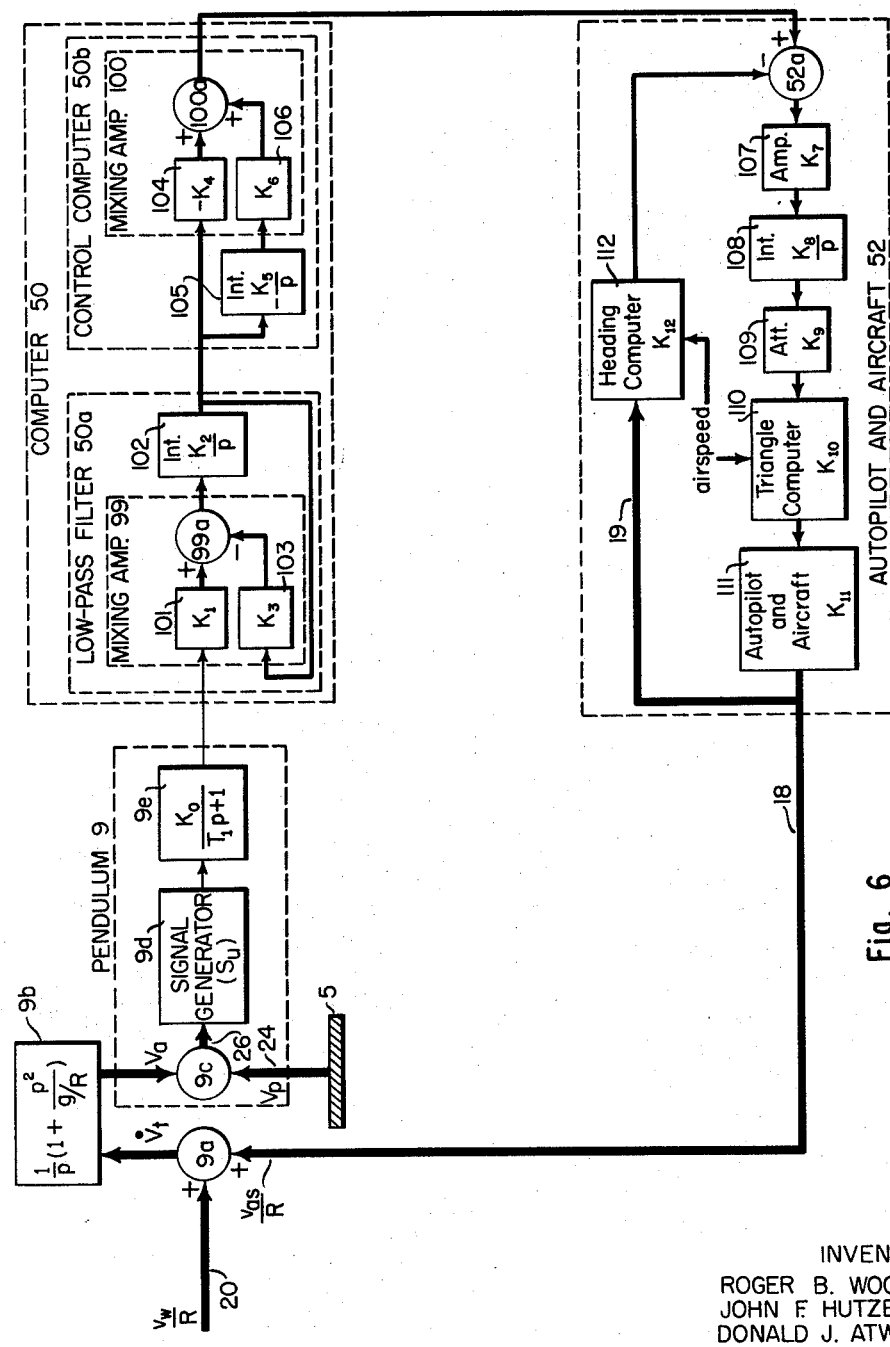

These and other features will appear from the accompanying drawings in which FIG. 1 is an illustrative diagram showing the general method used in the present invention; FIG. 2 is an illustrative diagram showing the forces and directions relating to a vertical-indicating pendulum; FIGS. 3, 5 and 6 are successively expanded functional or block diagrams of the present invention, and FIG. 4 shows a pendulum unit suitable for use in the present invention.

The principles of operation of the present invention will appear in FIG. 1 which is a schematic drawing illustrative of the method taught by the present invention for detecting a deviation from a known course over the earth's surface. FIG. 1 is a plan view looking down the course which is shown by the dot 2, on the earth 1 whose center is at 3. The radius of the earth is denoted R. A member 5 is shown in two positions at A and B on the earth's surface. The point A is on the course 2. The member 5 is maintained horizontal at the point A and means are provided so that it retains that orientation even if it is deviated from the course 2, as shown at point B. Mounted on the member 5 by means of a pivot 7 is a pendulous mass 9′. Assuming no acceleration normal to the course 2, the pendulum 9′ hangs with its vertical axis along the true vertical at the points A and B respectively. Means are provided for measuring the angular deflection of the vertical axis of the pendulum 9′ from its position at the point A on the earth. Thus, at point B the angle C is read out as the angle between the vertical axis of the pendulum 9′ and a line $V_p$ normal to the member 5 and therefore parallel to the vertical at the point A. It can be seen from the geometry of FIG. 1 that this angle C between the member 9′ and the line $V_p$ is equal to the essentially geocentric angle C between the points A and B. Therefore, the deviation from the course 2 of the member 5 may be measured by measuring the deflection of a pendulous mass 9′ with respect to the member 5, provided that the member 5 is maintained parallel to the horizontal at point A, and provided that the pendulum indicates true vertical.

There are therefore two essential problems to be solved. The first of these is to maintain the member 5 in the above-described position and the second reference is to provide a satisfactory indication of true vertical. Reference is therefore made to two copending applications which are closely related to these problems. The first of these is the co-pending application of Draper, Wrigley, Woodbury and Hutzenlaub, Serial No. 303,242, filed August 8, 1952, which shows means for so maintaining a member 5.

The apparatus described in the above mentioned application, Serial No. 303,242, comprises a controlled member which is caused to maintain a fixed orientation in inertial space by means of three gyroscopes which are preferably of the single-degree-of-freedom type. Mounted on the controlled member is an earth reference gimbal which would also maintain a fixed position in inertial space except for the fact that a sidereal time drive is provided to turn it with respect to the controlled member about an axis parallel to the earth's polar axis and at the sidereal rate. The earth reference gimbal thus becomes a model of the earth itself. It is initially set in fixed relation to the programmed great circle course and it is mounted for rotation about an axis which is called the equatorial axis and which is parallel to the line of intersection of the equatorial plane with the programmed great circle plane. The apparatus is also provided with suitable gimbals for base motion isolation, and one of said gimbals is a range gimbal, which is in fact clamped to the earth reference gimbal at the start of the course.

Suitably connected with the range gimbal is a member upon which is supported the pendulum 9′. Said member is actually the platform member 5 which bears a fixed relation to the programmed great circle course and is in a plane perpendicular to the programmed plane. The pendulum 9′ is pivoted to swing in a plane perpendicular to the plane of the programmed great circle. As described in the copending application the member 5 also carries a second pendulum adapted to swing in the plane of the programmed great circle, but the present invention is not concerned with the motions of the second pendulum.

The device there shown is a gyro-controlled gimbal configuration which "remembers" a course, by holding a member (such as 5) perpendicular to a vertical course plane. However, the present invention is sufficiently general so that it will work with any device which fixes a plane horizontal and normal to the vertical course plane. The second is the co-pending application of Wrigley and Draper, Ser. No. 249,182 filed September 21, 1951 which describes a method and means for deriving from a pendulum or other acceleration-detecting means a satisfactory indication of true vertical. This is done by the principle known as Schuler tuning which is fully described in that application, and is further improved by providing damping against inherent errors in such a system.

The present invention involves a difficulty in indicating the vertical which is not present in the Wrigley and Draper reference. That is, since the present invention is a guidance system, the geocentric angular deviation C detected as shown in FIG. 1, is used as an input to an autopilot to return the vehicle carrying the member 5 to its course 2. So returning the vehicle causes accelerations parallel to the plane of FIG. 1 and these accelerations cause an error in the indication of the vertical by the pendulum 9'. When the vertical is merely to be indicated, as in the Wrigley and Draper invention, the only error-causing effects are exterior to the vertical-indicating system; here error-causing effects are inherent in the guidance system itself. Therefore, the conditions of Schuler tuning utilized in the present invention and the form of damping used herein differ from those used in the Wrigley and Draper invention. However, we wish it understood that the present explanation is to be supplemented by a reference to the two above-mentioned copending applications.

The present invention, then, is directed toward deriving from a pendulum 9' information as to the true vertical which will provide a satisfactory error signal to an autopilot; this means that the detection of the vertical must be such that it is substantially free of errors due to random cross-course accelerations, such as wind, erroneous settings of the control surfaces, and such effects plus cross-course accelerations due to autopilot action in response to the said error signal.

A satisfactory indication of the vertical in the presence of linear horizontal acceleration is obtained by providing Schuler tuning in an acceleration-detecting device, according to the principles explained in the above-mentioned copending Wrigley and Draper application. Those principles will be briefly summarized here; a more detailed description will be found in that application. It can be shown mathematically that a pendulum with an 84 minute period will indicate true vertical regardless of accelerations of its support. However, such a long pendulum is a physical impracticability. A pendulum which is equivalent to a physical Schuler pendulum may be made by integrating twice the output from the acceleration-detecting means and using this doubly-integrated output to move a member on which the acceleration detecting means is mounted, thus creating an oscillatory system which is sensitive to acceleration. The period of the oscillatory system is set by adjusting electrical constants and can then be made 84 minutes. Such a system, however, has inherent errors (slight initial misalignments or imperfect instrumentation) and these inherent errors are considerably reduced by the introduction of damping into the system. This damping causes the errors to decrease as time passes, whereas if there were no damping the errors would persist, and in some cases, increase with time. The introduction of damping causes other errors, however, namely, forced dynamic errors, that is errors which result from the system's lagging behind rapid changes in its input. In other words, a damped pendulum will not swing instantaneously to true vertical as the orientation of the true vertical in space changes, and if that orientation changes sufficiently fast the pendulum will give a false reading. The above mentioned application of Wrigley and Draper provided a specified type of damping which satisfactory reduced both inherent and dynamic errors for a vertical-indicating system; the present invention is directed toward a guidance system which is Schuler tuned and which is damped by a specified type of damping which reduces both those errors in a guidance system where part of the error-inducing acceleration comes from the guidance system itself.

Thus, referring to FIG. 1, the present invention provides means for acting upon the indicated deflection of the pendulum 9' (the angle C) so as to produce an input for an autopilot which will move the pendulum assembly back on to the course 2. This apparatus will include a specified type of damping, which will be described in more detail below. The present invention will be described in terms of a pendulum, but it will be obvious to one skilled in the art that with minor changes in the configuration linear accelerometers may be used.

FIG. 2 is a diagrammatic drawing to show the angles and directions involved in the guidance problem. The member 5 is shown as it appears at the point B, but with the assembly subjected to a horizontal acceleration which generates an inertia reaction force at the center of gravity 6 of the pendulous mass. This reaction force is shown as $f_H$, and it plus the gravity force $g$, combine to form the resultant sum of the forces on the pendulous mass. The direction of this resultant force is the apparent vertical $V_a$. (The forces $f_H$ and $g$ are shown as specific forces, i.e., forces per unit mass, and therefore have the units and magnitude of their respective accelerations.)

It will be assumed that the angle $A_{(t-a)}$ (which is the angle between true vertical $V_t$ and apparent vertical $V_a$) is small. This represents an assumption that any vertical accelerations are negligibly small in comparison with the gravity force, and that the amount of horizontal acceleration is small enough so that the angle (in radians) between the apparent vertical and true vertical, $A_{(t-a)}$, is substantially equal to its sine. Empirically, it can be seen that any large-value accelerations must have short periods, or else the aircraft would acquire velocities far higher than those practicable with present-day aircraft. Furthermore, there is damping associated with the pendulous mass 9', preferably enough so that its time constant is ten seconds or more; then, the pendulum will not react to these large short-period accelerations, but only to persistant accelerations. The ultimate justification for the assumption is that it has been found to work out in practice.

The vertical $V_p$ at the point B, namely, the normal to the member 5 is the programmed vertical, that is, the vertical, represented by the programmed position of the aircraft. The angle between programmed vertical and true vertical is $A_{(t-p)}$ and its negative is C, the error angle. The purpose of the guidance system is to maintain C as nearly zero as possible; small-angle approximations are therefore satisfactory for the angle C. C is to be the error input to the autopilot computer.

Under acceleration conditions, as in FIG. 2, the direction of true vertical $V_t$ is not known. The only quantity which can be measured is the angle between the pendulum 9' and the member 5. This is the angle between apparent vertical and programmed vertical, shown as $A_{(p-a)}$ in FIG. 2. Schuler tuning and damping makes it possible to derive from $A_{(p-a)}$ the value of C.

The condition for Schuler tuning will be shown by reference to FIG. 3. It is to be understood that signal-generating means 9d are to be added to the pendulous mass 9' of FIGS. 1 and 2 so as to form a pendulum unit 9 which generates an electric signal which is an indication of the angle of deflection of the pendulous mass 9' with respect to the member 5, that is $A_{(p-a)}$. The pendulum unit is indicated generally at 9 in FIG. 3 and its mechanical and mathematical properties by the circle 9c and the expressions for its associated kinematics at 9a and 9b. The pendulum's signal generator 9d generates an electric output $e$, which is proportional to $A_{(p-a)}$ by the pendulum unit sensitivity $S_u$ (volts per radian). This output is indicated by the light arrow 12. (In FIG. 3, and throughout this specification, light arrows are used to designate signal-level electrical connections, medium arrows for power-level electrical connections, and heavy arrows for mechanical connections.)

The pendulum output signal $e$ is passed to a computer 50 which generates a suitable input $i$ to the autopilot and aircraft 52. The computer raises the power level of the signal $e$ and makes $i$ a function of $e$ (and therefore of $A_{(p-a)}$) represented by its transfer function F, so that $i$, indicated by the arrow 14 is proportional to F$e$.

The autopilot and aircraft, shown at 52, control the direction of the airspeed of the aircraft so as to null out the input $i$ to the autopilot, producing an angular position C of the aircraft with respect to its programmed course, or a cross-course airspeed $v_{as}$ as indicated by the arrows 16 and 18 respectively which are the output of the guidance system (16), and, a cross-course input to the pendulum 9 (as indicated by the arrow 18). The geocentric velocity of cross-course airspeed $v_{as}/R$ is proportional to the input current $i$ multiplied by the sensitivity of the aircraft and autopilot $S_a$. It should be noted that the system changes the cross-course airspeed by changing the heading direction. It would also be possible to do this by varying the total airspeed itself, but it is usually desirable to have the airspeed separately controlled so that the most efficient fuel consumption may be achieved.

The guidance system is sensitive to all cross-course velocities (or accelerations) that is, cross-course velocities of the aircraft with respect to the air (18) and cross-course velocities of the air with respect to the earth (20). Both the cross-course airspeed and the cross-course windspeed are taken as essentially geocentric angular velocities $v_{as}/R$ and $v_w/R$ respectively. The system can detect only their sum as indicated by the addition 9$a$. This is the same as saying that the system detects the rate of change of the direction of the true vertical $\dot{V}_t$ (as shown by the arrow 22). (Throughout the present specification (·) and $p$ are used to represent the differential operator $$\left(\frac{d}{dt}\right)$$

so that (··) and $p^2$ are $$\left(\frac{d^2}{dt^2}\right)$$

and so that multiplication by $1/p$ represents the integration of a quantity; these are well-known techniques of analysis of linear systems.)

The block 9$b$ represents the kinematics associated with the pendulum, that is, the mathematical operations performed such that the physical input to the pendulum is properly related to its navigational input. The navigational input to the pendulum is $\dot{V}_t$, the rate of change of direction of true vertical, that is, the geocentric rate by which the aircraft is moving off course. Physically, the pendulum detects the direction $V_a$, the direction of apparent vertical. This direction referred to true vertical, has two components, C, the angle between programmed vertical $V_p$ and true vertical $V_t$ and $A_{(t-a)}$, the angle between apparent vertical and true vertical. The latter angle (see FIG. 2) is $f_H/g$. If $f_H$ is converted to an essentially geocentric acceleration, it is $-R\ddot{A}_{(t-p)}$ or $R\ddot{V}_t$ that is, the angular acceleration of true vertical from a reference vertical $V_p$. This can be represented as:

(1) $$V_a - V_t = \frac{R\ddot{V}_t}{g}$$

Therefore:

(2) $$V_a = \dot{V}_t\left[\frac{1}{p}\left(1+\frac{p^2}{g/R}\right)\right] \text{ or } A_{(p-a)} = \dot{A}_{(p-t)}\left[\frac{1}{p}\left(1+\frac{p^2}{g/R}\right)\right]$$

Thus, the block 9$b$ indicates the geometry associated with the pendulum which converts its navigational input $\dot{V}_t$ to its physical input $V_a$ (represented by arrow 23). The subtraction 9$c$ shows that the pendulum is sensitive to changes in the angle between apparent vertical $V_a$ and programmed vertical $V_p$, that is, the angle between the mass axis and the case. A signal generator 9$d$ is provided to generate a signal $e$ proportional to the deflection angle of the pendulum (which is the angle between the mass axis and the case or $A_{(p-a)}$. The signal generator sensitivity is shown as $S_u$.

The above description of the loop of FIG. 3 may be summarized in Equation 2 and four other equations:

(3) $$e = S_u A_{(p-a)}$$

(4) $$i = Fe$$

(5) $$\frac{v_{as}}{R} = S_a i$$

(6) $$\dot{v}_t = \frac{v_{as}}{R} + \frac{v_w}{R} = \dot{A}_{(p-t)}$$

These equations may be combined to give the performance function of the entire guidance system, that is, an expression for C, the essentially geocentric angular deviation from the course, ($A_{(p-t)}$) as a function of the error-causing input, $v_w/R$, the cross-course component of wind velocity, considered as an essentially geocentric angular velocity. This expression is:

(7) $$\left(\frac{R}{g}\right)S_a S_u \ddot{C} - \frac{\dot{C}}{F} + S_a S_u C = -\frac{1}{F}\left(\frac{v_w}{R}\right)$$

It can be seen that this is a performance equation for a negatively damped oscillatory system responding to a forced error if F is a constant. The condition for Schuler tuning is to make the system response independent of its error-causing input. The component of FIG. 3 which may be varied to do this is the computer 50 with its transfer function F.

If F is made negative and as large as possible (ideally, $-\infty$), Equation 7 reduces to:

(8) $$\ddot{C} + \frac{g}{R}C = 0$$

The system is equivalent to a Schuler-tuned pendulum because the position of the aircraft on or off course is independent of cross-course accelerations. Equation 8 is the equation of an undamped, unforced oscillatory system.

Equations 7 and 8 may be compared with the corresponding equations 20 and 10 of the above-mentioned copending application of Wrigley and Draper. Equations 8 and 10 correspond to each other and are the ideal performance equations for, respectively, the guidance system of the present invention and the vertical-indicating system of the other invention, and both correspond to the equation of motion of a theoretical Schuler pendulum, that is, an undamped pendulum with a period of $2\pi\sqrt{R/g}$ or 84 minutes. In the present invention, the airplane itself may be considered the pendulum bob. However, the two conditions for Schuler tuning are different: in the present invention, the computer 50 was given an infinite sensitivity and an integration was performed by the autopilot-aircraft (velocity proportional to input current); in the other invention, the function generator ideally was given a sensivity of $g/R$ plus a stage of integration and it was assumed the drive system there would provide a second integration (velocity proportional to input current). This difference arises because, in the vertical-indicating system, no part of the error-causing motion was due to the system, but in the present invention, the airspeed component of the error-causing motion is due to the guidance system itself.

This ideal value of $F = -\infty$ cannot be achieved in practice, and therefore, the computer 50 must be provided with damping and other compensations as will be described below; however, FIG. 4 will be referred to now to show a type of pendulum unit suitable for the present invention, in that it provides both the pendulous mass and the signal generator described above, together with damping to remove the effects of large short-period accelerations.

The unit is contained in the cylindrical case 150 and consists of two sections, an inertial element 160 with associated damping and a signal generator 171. Torques are summed about the shaft 154 which is mounted in jewelled bearings shown at 152. For the sake of accuracy it is desirable to have bearing friction as low as possible. The pendulous mass is at 160 rigidly attached to the shaft 154; it should be noted that it need be of no particular shape so long as there is a moment distance between its center of mass and the center of rotation in the shaft 154. It is desirable to damp the pendulum, for reasons which are discussed more fully above. Therefore, surrounding the pendulous mass and rigidly attached to the shaft 154 is the float 162. Thus, when the shaft 154 is rotated, the float is also. The float is of dimensions such that the clearance between it and the case 150 is very small, of the order of a few thousandths of an inch. The case is filled with a high-density, high viscosity fluid, which supplies the damping. The fluid fills the space between the float and the case and therefore gives rise to a viscous shear force when the float (i.e., the shaft 154) is rotated. Furthermore, because the float 162 is totally immersed in the fluid there is a buoyant force exerted on it which counterbalances the weight, thereby largely removing the weight force from the bearings 152. In practice, the weight force on the bearings may be about a kilogram; the relation of float and buoying fluid may be arranged to reduce the force on the bearings to approximately one gram. The fluid serves another purpose; if the pendulum is to be mounted in a vehicle, such as an aircraft, as will usually be the case, the unit will be subjected to jolts and sudden accelerations which would cause sizable reaction forces on the bearings 152. The fluid acts as a cushion, transmitting these reaction forces to the case 150 directly, by-passing the bearings. This permits the more delicate types of frictionless bearings to be used.

The second section of the pendulum unit comprises a signal generator 171, preferably of the type described in U.S. Patent No. 2,488,734 of Mueller, November 22, 1949. Such a signal generator comprises a rotor, shown at 170, rigidly attached to the shaft 154, and a stator 172 mounted on the case 150. Windings 174 are provided on the stator. A reference voltage applied to the windings produces an output voltage whose magnitude is proportional to the angle between the rotor and its neutral position with respect to the stator, as described in the abovementioned patent. Thus, an electrical measure of the pendulum deflection is provided.

This preferred pendulum unit is preferably of the type shown in the copending application of Jarosh and Picardi, Serial No. 222,792, filed April 25, 1951. The unit is clamped on a member which indicates the programmed vertical, so that deflections of the shaft 154 with respect to the case represent deflections of the pendulous element 160 with respect to the member, like the pendulous mass 9′ and member 5 of FIGS. 1, 2, and 3.

It is to be understood that an accelerometer could be used instead of a pendulum. Mounting an accelerometer on the member 5, would cause it to read the components of gravity and in inertia reaction force normal to $V_p$ (see FIG. 2), that is, $$[f_H \cos A_{(p-t)} - g \sin A_{(p-t)}]$$

Since $A_{(p-t)}$ is a small angle, this reduces to $[f_H - gA_{(p-t)}]$ and further, to $R\ddot{C} + gC$. The kinematics, then, of an accelerometer would be the same as those of the pendulum except for a factor of $g$:

$$\frac{g}{p}\left[1 + \frac{R_p{}^a}{g}\right]$$

Inserting this value for the block 9b in the above equations does not fundamentally change the specified form of the computer 50. The equations below (dealing with actual, not theoretical, instrumentation) may be suitably modified by taking into account the extra factor of $g$.

It will be understood that the system of FIG. 3 in which $F$ is $-\infty$ is physically impracticable, and furthermore has certain undesirable characteristics. First, it is physically impracticable to generate an infinite quantity. Therefore, there is inherently a damping or $\dot{C}$ term in Equation 8. One feature of the present invention is to provide damping which makes use of this inherent damping rather than trying to minimize the inherent damping. Secondly, the provision of an infinite response in the computer 50 means that the aircraft must move a finite amount in zero time, which is impracticable. Third, there is at least one inherent source of error even in the ideal system of FIG. 3. This is initial alignment.

It can be seen from Equation 8 that if there is a value of $C$ or $\dot{C}$ when the system is started, the airplane will oscillate about its course with a period of 84 minutes, just as if it were a pendulum which was initially deflected or swinging. However, if damping is provided in the system, these initial misalignments will decrease with time, and may, in a matter of hours, practically disappear, just as a damped pendulum settles down about its zero position.

It will now be shown how the configuration of the computer 50 is altered so as to provide suitable characteristics for a feasible system, by introducing damping and suitable modifications of the high and low frequency response of the system.

Equation 7 may be rewritten as follows, so as to describe the relation between the miles-off-course error (RC) and the cross-course wind velocity $v_w$ which causes the error:

$$(9) \quad \frac{RC}{v_w} = \frac{\left(-\frac{1}{F}\right)}{\left[\frac{R}{g}S_a S_u\right]p^2 + \left(-\frac{1}{F}\right)p + S_a S_u}$$

where $p$ is the differential operator $$\left(\frac{d}{dt}\right)$$

It can be seen from Equation 9, that if $F$ is made $-\infty$, the system has zero error for all frequencies of the disturbing function $v_w$. ($p = j\omega$, where $\omega$ is the frequency in radians per second.)

Practically, however, $F$ can at best be made $-C_1$, where $C_1$ is a constant and very large. In such a case, there is a small error at all frequencies substantially equal to $$\frac{1}{-C_1 S_a S_u\left[-\frac{\omega^2}{\omega_0{}^2}\right]}$$

where $\omega_0$ is $\sqrt{g/R}$. The error is very nearly a maximum at the point where $\omega$ is $\omega_0$. This error is especially critical at zero and the low frequencies, since these errors will persist throughout the entire trip whereas higher-frequency errors average out. The low-frequency error could be eliminated by making $C_1$ very large, but this corresponds to making an autopilot with a very large sensitivity which is physically impracticable. Therefore, a more satisfactory procedure is to introduce a channel of integration in parallel with the $C_1$ channel; that is, to modify $F$ by a parallel integration so that:

$$(10) \quad F = -\left(C_1 + \frac{C_2}{p}\right)$$

In such a case, the performance Equation 9 becomes:

$$(11) \quad \frac{RC}{v_w} = \frac{p}{S_a S_u\left[\left(\frac{C_1}{\omega_0{}^2}\right)p^3 + \left(\frac{C_2}{\omega_0{}^2} + \frac{1}{S_a S_u}\right)p^2 + C_1 p + C_2\right]}$$

Since $p = j\omega$, as the frequency $\omega$ goes to zero, the error goes to zero. Therefore, the low-frequency errors are removed by including in the configuration of the computer 50, a high-gain direct channel ($C_1$) and in parallel with it a channel containing an integrator $$\left(\frac{C_2}{p}\right)$$

It should be noted that if $C_2$ is made zero and $C_1$ infinite, Equation 11 reduces to Equation 8.

However, since the frequencies the aircraft can react to are limited it is desirable to cut off the high frequency components of $v_w$ which are imposed on the system. Therefore, a low-pass filter is included in the computer 50. Such a filter may be made by conventional electronic methods, but we have found the most satisfactory mechanization is to use an integrator (preferably of the motor-tachometer-generator type) with negative feedback from its output to its input. Such an arrangement has a performance function $$\frac{1}{T_2 p + 1}$$

where $T_2$ is the inverse sensitivity of the integrator. When this function is included in the function F, F becomes:

(12) $\qquad F = -\left(\frac{C_1 p + C_2}{p}\right)\left(\frac{1}{T_2 p + 1}\right)$ In such a case, the system performance Equation 9 becomes:

(13) $\qquad \dfrac{RC}{v_w} = \dfrac{p(T_2 p + 1)}{S_a S_u \left[\dfrac{C_1}{\omega_0^2} + T_2\right] p^3 + \left[\dfrac{C_2}{\omega_0^2} + \dfrac{1}{S_a S_u}\right] p^2 + C_1 p + C_2}$ This indicates similar characteristics to Equation 11 in that the error at zero frequency is zero, but has a greater cut-off as $p$ or $j\omega$ becomes larger than $\omega_0$.

FIG. 5 shows this embodiment. The pendulum configuration is the same as that of FIG. 3, but the computer 50 has been modified so that it has the performance equation specified by Equation 12. The function $$\frac{C_1 p + C_2}{p}$$

is generated by an amplifying channel in parallel with an integrating channel. The function $$\frac{1}{T_2 p + 1}$$

is generated by an integrator with negative feedback.

The computer 50 is shown as a filter 50a and a control computer 50b. The filter is made by an integrator $$\left(\frac{1}{T_2 p}\right)$$

with negative feedback and has a transfer function $$\frac{1}{T_2 p + 1}$$

The control computer comprises the direct channel $$(-C_1)$$

and the integrating channel $$\left(-C_1 + \frac{C_2}{p}\right)$$

and has a transfer function $$-\left(C_1 + \frac{C_2}{p}\right)$$

Together these two generate the function F prescribed by Equation 12.

In addition the characteristics of the autopilot and aircraft are shown generally at 52. They are represented by an integrator 52b with negative feedback. The reason for this will be discussed more fully below. It suffices to say at this point that the autopilot-aircraft produces a cross-course airspeed $V_{as}$ proportional to the integral of the input current represented by the arrow 14. The actual cross-course airspeed is compared to the commanded cross-course airspeed (arrow 14) by means of the feedback shown at 52a, so the thing which actuates the autopilot and aircraft 52 is actually the difference between what the cross-course airspeed is and what it ought to be. The transfer function of this configuration is therefore $$\frac{1}{T_3 p + 1}$$

This is merely another low-pass filter like 50a and only adds greater attenuation to the higher-frequency disturbances. The overall computer function F (from the filter 50a, control computer 50b and the autopilot and aircraft 52) becomes:

(14) $\qquad F = -\left(\dfrac{C_1 p + C_2}{p}\right)\left(\dfrac{1}{T_2 p + 1}\right)\left(\dfrac{1}{T_3 p + 1}\right)$ The overall performance equation becomes $$\frac{RC}{v_w} = \frac{p(T_2 p + 1)(T_3 p + 1)}{(T_2 T_3) p^4 + \left(T_2 + T_3 + \dfrac{S_a S_u C_1}{\omega_0^2}\right) p^3 + \left(\dfrac{S_a S_u C_2 + 1}{\omega_0^2}\right) p^2 + (C_1 S_a S_u) p + C_2 S_a S_u} \qquad (15)$$

The invention has been discussed in terms of a computer function of the form $$\frac{C_1 p + C_2}{p(T_2 p + 1)}$$

which produced the desired conditions of zero error at zero frequency and high-frequencies cut off. It will be understood that any function F of the type:

$$F = \frac{\sum C_n p^n}{\sum T_m p^m}$$

could be used, $p$ being the differential operator $$\left(\frac{d}{dt}\right)$$

T and C being constants, $m$ and $n$ being integers with $m$ at least one greater than $n$.

FIG. 6 shows in detail a preferred instrumentation of the guidance system as a whole. The various components have been shown as blocks since they are made as indicated from amplifiers and integrators, which are components well known to those skilled in the art.

As shown in FIG. 6, the input to the pendulum 9 is the cross-course wind velocity and the cross-course airspeed, summed as indicated by the operation 9a. The total velocity, equal to the rate of change of true vertical, $\dot{V}_t$, is converted by the kinematics to $V_a$, which is measured against the programmed vertical $V_p$ to give the angle, $A_{(p-a)}$. The pendulum produces an output proportional to the amount of this angle as indicated by the operation 9c. The operations 9a, 9b and 9c have been described in detail above and will not be further explained at this point. The operation indicated as 9e has not been discussed before. The constant $K_0$ represents the pendulum unit sensitivity $S_u$ in volts per unit angular deflection. The denominator of the term 9e represents the effect of the pendulum damping on the pendulum deflection. The damping causes the pendulum to line up with apparent vertical through an exponential rise of time constant $T_1$. The value of $T_1$ which has been found most satisfactory is 15 seconds. The effect of the damping is to attenuate input components of periods materially shorter than 15 seconds. The expression 9e or the effect of the pendulum damping assumes that the pendulum is considerably overdamped so that inertia terms (in $p^2$) do not enter appreciably into the pendulum operation. It is to be understood that the damping associated with the pendulum introduces no appreciable delay in the overall system operation, since its period (15 seconds) is so much shorter than the 84-minute period of the overall system.

The computer 50 contains the low-pass filter and the control computer as described above. The low-pass filter is made by feeding back the output of an integrator to its input. Thus, the integrator 102 has its output feed back through one channel 103 of a mixing amplifier 99, and subtracted from the input to the integrator which has been passed through the other channel 101 of the mixing amplifier. This configuration is substantially the same as that described above and in FIG. 5. The control computer 50b provides the control function indicated in Equation 10. A direct channel is provided through one channel 104 of a mixing amplifier 100; through the other channel 106 of the mixing amplifier, is a path containing a stage of integration, that is, the integrator 105. The output of the integrator is amplified in the second channel 106 of the mixing amplifier 100 and the two outputs of the two channels are summed (as shown at 100a) and used to activate the autopilot and aircraft 52.

As described above, the output from the computer 50 is the desired cross-course velocity to maintain the aircraft on its course against cross-course disturbances, such as wind. The configuration of the autopilot and aircraft 52 is such that the aircraft responds to an input current with a cross-course airspeed proportional to that input current.

A configuration for accomplishing this is shown generally at 52 in FIG. 6. Its overall operation is to receive the commanded cross-course airspeed as a current input to the amplifier 107 and to calculate the change in heading required at the operating airspeed of the aircraft to produce that velocity. Then, a check on that velocity is provided by means of the heading computer 112 whose output is returned as a negative feedback (52a) to the amplifier 107. Thus, the actual input to the amplifier 107 is the difference between the commanded cross-course velocity and the actual cross-course velocity. The overall characteristic of the autopilot in aircraft 52 is that of an integrator with its output fed back on its input negatively, as shown in FIG. 4. In the present system the time constant $T_3$ of autopilot and aircraft was set at two minutes, a figure fixed by the characteristics of the autopilot and aircraft.

The amplifier 107 raises its input to a suitable power level to be acted upon by the integrator 108. The purpose of the integrator is to introduce a time lag in the autopilot and aircraft operation. The integrator output is reduced by the attenuator 109 to a suitable power level for operation of the triangle computer 110.

The purpose of the triangle computer 110 is to determine the angle the aircraft should head with respect to its course so as to produce the desired cross-course velocity as indicated by the computer 50. As such, it must have as one input the airspeed, and as the other, a desired cross-course velocity. It must solve for the angle whose sine is the desired cross-course velocity divided by the airspeed. As such, the triangle computer can be made by means of a synchro or angle resolver, or any other conventional trigonometric function generating means. Its output represents the angle the aircraft should be with respect to its course. This output is used to activate the autopilot and thereby move the aircraft indicated at 111 with the desired cross-course velocity.

The heading computer 112 calculates the actual cross-course velocity of the aircraft. By some means, indicated generally by the arrow 19, one input to the heading computer is made the angle with which the aircraft is flying with respect to its course. This angle may be determined from the gimbal configuration associated with the member 5. That is, the member 5 retains the direction of the course as a physical direction in the system associated with it. The angle between this physical direction and the longitudinal axis of the aircraft is the angle the aircraft is flying with respect to its course. A synchro or repeater servo system may be used to impose this angle on the heading computer 112. The other input to the heading computer is the airspeed. The heading computer multiplies the airspeed by the sine of the angle between the direction of flight and the course, thus giving the cross-course velocity. The heading computer may therefore be an angle resolver or synchro or other conventional trigonometric function generating means. The output of the heading computer is imposed by a negative feedback 52a on the amplifier 107. Thus, the actual input to the autopilot and aircraft 52 is the difference between the called-for cross-course airspeed and the actual cross-course airspeed.

It should be noted that the present guidance system operates by adjusting the heading of the aircraft rather than by adjusting the airspeed of the aircraft. In this way it is possible for the aircraft to operate at any desired airspeed at all times, regardless of the wind velocity which is imposed on it. Thus, the airplane may at all times be operated at peak efficiency with respect to fuel consumption. However, in certain applications, it may be desirable to vary the airspeed itself. Therefore, the present invention should not be construed as limited to the particular form of autopilot computer shown in FIG. 6 (components 52a, 107, 108, 109, 110 and 112).

It should be understood that the configuration for operating the autopilot and aircraft shown generally at 52 is a preferred form only, and the invention is not to be limited to this particular configuration. However, the arrangement as shown in FIG. 6 contains certain advantages. First, the performance function of the autopilot and aircraft 52 is made such that the system operates as a low-pass filter, thus reducing the sensitivity of the autopilot to high-frequency disturbances. Second, since the heading computer 112 subtracts from the input to the autopilot 111 the airspeed, the pendulum 9 and computer 50 are substantially relieved from errors caused by cross-course accelerations. There are two error-causing inputs to the system: the cross-course wind and the cross-course airspeed. By eliminating the necessity for compensating for errors in the cross-course airspeed, the overall system error is reduced generally by one-half.

One further compensation remains to be mentioned. As the aircraft flies over the earth it is subject to Coriolis accelerations, the largest of which acts across the aircraft's course, thus causing a false reading in the pendulum 9. For very accurate work, compensation should be introduced for this Coriolis error. This compensation should be the subtraction from the output of the pendulum 9 of a quantity representing the angular deflection due to Coriolis forces. The Coriolis force is proportional to the velocity of the aircraft with respect to the earth times the sine of the latitude. A quantity representing this acceleration may be generated by any suitable means, and subtracted from the output of the pendulum 9. Means for correcting for Coriolis effects are shown in more detail in the abovementioned copending application of Draper, Wrigley, Woodbury and Hutzenlaub.

The overall performance equation of the configuration shown in FIG. 6 is given in Equation 16.

$$\frac{RC}{v_w} = \frac{1}{p\left[1+\frac{1}{p}\left(1+\frac{p^2}{\omega_0 2}\right)\left(\frac{K_0 K_1}{T_{1p}+1}\right)\left(\frac{1/K_3}{\frac{1}{K_2 K_3}p+1}\right)\left(\frac{K_{4p}+K_5 K_6}{p}\right)\left(\frac{1/K_{12}}{\frac{1}{K_7 K_8 K_9 K_{10} K_{11} K_{12}}p+1\right)\right]}$$

(16)

It will be seen that the various K-terms of Equation 16 can be directly related to the corresponding terms of the desired performance equation indicated in Equation 14 as follows: ($T_1$ is not included in Equation 14, but it will be understood that the equation can be modified by simply including in the F of Equation 14 the term $$\left(\frac{1}{T_1p+1}\right)$$

$$T_2 = \frac{1}{K_2K_3}$$

$$T_3 = \frac{1}{K_7K_8K_9K_{10}K_{11}K_{12}}$$

$$C_1 = \frac{K_0K_1K_4}{K_3K_{12}}$$

$$C_2 = \frac{K_0K_1K_5K_6}{K_3K_{12}}$$

Therefore the method for setting the sensitivites of the various amplifiers and integrators of FIG. 6 is to determine the desired values of the constants in Equation 13, and then to adjust the sensitivities so as to produce those constants. A typical set of values for the constants $C_1$, $C_2$, $T_1$, $T_2$ and $T_3$ for the overall performance equation are as follows: $C_1$ is 15 hrs. $^{-1}$; $C_2$ is 18 hrs. $^{-2}$; $T_1$ is 15 seconds; $T_2$ is 4 minutes; and $T_3$ is 2 minutes. These values are to be regarded as illustrative only and the invention is not to be construed as limited to them.

Having thus described our invention, we claim:

1. In a guidance system for holding on course a vehicle which contains automatic piloting apparatus and a member which is fixed with respect to a line normal to the course plane: means for detecting accelerations and generating an output signal proportional thereto, so mounted on the member as to detect accelerations which are substantially horizontal and normal to the course, connections to activate the autopilot from said signal, and function generating means to modify said signal to move the vehicle in a direction opposite to the direction of the accelerations with a velocity which is proportional to $$\frac{\Sigma C_n p^n}{\Sigma T_m p^m}$$

times the signal (where C and T are constants, $m$ and $n$ are integers and $m$ is at least one greater than $n$, and $p$ is the differential operator).

2. In a guidance system for holding on course a vehicle which contains automatic piloting apparatus and a member which is fixed with respect to a line normal to the course plane: a single-degree-of-freedom pendulum mounted on the member so as to detect accelerations in a plane which is substantially vertical and normal to the course, signal-generating means for producing a signal substantially proportional to the pendulum deflection, and connections to activate the autopilot from said signal, and function generating means to modify said signal to move the vehicle in a direction opposite to the direction of the accelerations with a velocity which is proportional to $$\frac{\Sigma C_n p^n}{\Sigma T_m p^m}$$

times the signal (where C and T are constants, $m$ and $n$ are integers and $m$ is at least one greater than $n$, and $p$ is the differential operator).

3. In a guidance system for holding on course a vehicle which contains automatic piloting apparatus and a member which is fixed with respect to a line normal to the course plane: a single-degree-of-freedom pendulum mounted on the member so as to detect accelerations in a plane which is substantially vertical and normal to the course, signal-generating means for producing a signal substantially proportional to the pendulum deflection, connections to activate the automatic piloting apparatus from said signal and function-generating means for modifying the signal to activate the piloting apparatus to move the vehicle in a direction opposite to the accelerations at a velocity substantially proportional to $$\left[C_1 + \frac{C_2}{p}\right]\left[\frac{1}{T_1p+1}\right]\left[\frac{1}{T_2p+1}\right]$$

times the signal (where C and T stand for constants and $p$ is the differential operator).

4. Apparatus as described in claim 3 in which the function-generating means comprises three stages, one being an amplifier in parallel with an integrator, and the two others being integrators with their outputs negatively fed back on their inputs.

5. Apparatus as described in claim 1 in which the adapting means comprises a plurality of stages of two types, the first being an amplifier in parallel with an integrator and the second being an integrator with its output negatively fed back on its input, there being more stages of the second type than of the first.

6. Apparatus as described in claim 2 in which the adapting means comprises a plurality of stages of two types, the first being an amplifier in parallel with an integrator and the second being an integrator with its output negatively feed back on its input, there being more stages of the second type than of the first.

7. In a guidance system for holding on course a vehicle which contains automatic piloting apparatus and a member which is fixed with respect to a line normal to the course plane: a single-degree-of-freedom pendulum unit mounted on the member so as to detect horizontal accelerations normal to the course, signal-generating means for producing a signal substantially proportional to the pendulum deflection, and function-generating means modifying the signal by a function $$\left[C_1 + \frac{C_2}{p}\right]\left[\frac{1}{T_1p+1}\right]\left[\frac{1}{T_2p+1}\right]$$

(where C and T are constants and $p$ is the differential operator), means adapting said modified signal to act as an input to activate the automatic piloting apparatus to move the vehicle in a direction opposite to the accelerations at a velocity proportional (by a constant M) to the modified signal, means generating from the horizontal airspeed velocity of the vehicle normal to the course a signal which is M times that velocity and means for subtracting said signal from the input to the automatic piloting apparatus.

References Cited in the file of this patent

UNITED STATES PATENTS

| | | |
|---|---|---|
| 2,099,808 | Havil | Nov. 23, 1937 |
| 2,449,177 | Perry | Sept. 14, 1948 |
| 2,579,570 | Hauptman | Dec. 25, 1951 |
| 2,581,743 | Zakheim | Jan. 8, 1952 |
| 2,613,071 | Hansel | Oct. 7, 1952 |